United States Patent
Seo (10) Patent No.: US 11,283,088 B2
(45) Date of Patent: Mar. 22, 2022

(54) COOLING SYSTEM FOR FUEL CELL ELECTRIC VEHICLE

(71) Applicants: HYUNDAI MOTOR COMPANY, Seoul (KR); KIA MOTORS CORPORATION, Seoul (KR)

(72) Inventor: Jung Min Seo, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 166 days.

(21) Appl. No.: 16/901,447

(22) Filed: Jun. 15, 2020

(65) Prior Publication Data

US 2021/0036342 A1 Feb. 4, 2021

(30) Foreign Application Priority Data

Jul. 30, 2019 (KR) .......................... 10-2019-0092507

(51) Int. Cl.
*H01M 8/04* (2016.01)
*H01M 8/04007* (2016.01)
*B60L 58/33* (2019.01)
*H01M 8/04746* (2016.01)

(52) U.S. Cl.
CPC ......... *H01M 8/04074* (2013.01); *B60L 58/33* (2019.02); *H01M 8/04768* (2013.01); *H01M 2250/20* (2013.01)

(58) Field of Classification Search
CPC .......... H01M 8/04074; H01M 8/04768; B60L 58/33
USPC .......................................................... 429/434
See application file for complete search history.

(56) References Cited

U.S. PATENT DOCUMENTS

| | | | |
|---|---|---|---|
| 6,408,966 B1 * | 6/2002 | Benz | B60L 58/33 180/65.1 |
| 10,392,018 B1 * | 8/2019 | Rhodes | B60H 1/3208 |
| 2016/0137068 A1 * | 5/2016 | Nada | B60L 7/14 701/70 |
| 2017/0036514 A1 * | 2/2017 | Umehara | B60H 1/00385 |
| 2018/0017014 A1 | 1/2018 | Higasa | |
| 2019/0271258 A1 * | 9/2019 | Mendez Abrego | F01P 7/165 |

FOREIGN PATENT DOCUMENTS

| | | |
|---|---|---|
| JP | 4984808 B2 | 7/2012 |
| JP | 6398507 B2 | 10/2018 |

* cited by examiner

*Primary Examiner* — James M Erwin
(74) *Attorney, Agent, or Firm* — McDonnell Boehnen Hulbert & Berghoff LLP (57) ABSTRACT

The present disclosure relates to a cooling system for a fuel cell electric vehicle. The cooling system includes a stack cooling line that cools a fuel cell stack of the fuel cell electric vehicle and a first cooling line of a closed loop type that cools at least some of first components that generate a larger amount of heat during braking of the vehicle than during driving of the vehicle, among components of the vehicle.

18 Claims, 7 Drawing Sheets

COOLING SYSTEM FOR FUEL CELL ELECTRIC VEHICLE

CROSS REFERENCE TO RELATED APPLICATIONS

This application claims the benefit of priority to Korean Patent Application No. 10-2019-0092507, filed in the Korean Intellectual Property Office on Jul. 30, 2019, the entire contents of which are incorporated herein by reference.

TECHNICAL FIELD

The present disclosure relates to a cooling system for a fuel cell electric vehicle.

BACKGROUND

In the case of a Fuel Cell Electric Vehicle, some of components constituting the vehicle (for example, a fuel cell stack) are required to be cooled with a coolant. However, in the case of a commercial vehicle using a fuel cell stack, a retarder brake has to be used as an auxiliary brake for assisting with braking by a main brake. The amount of heat generated from the retarder brake during braking is proportional to the weight of the vehicle. Accordingly, the amount of heat generated from a retarder brake of a large commercial vehicle cannot help but be very large.

To cool the retarder brake, a cooling system having a very high cooling capacity is required. For example, a radiator having a very large size may be required to be installed to cool the retarder brake. However, because the retarder brake generally functions in a specific situation such as hard braking, it is very disadvantageous in terms of space utilization or costs to install the radiator having a very large size in the vehicle so as to prepare for the specific situation. Alternatively, a cooling fan may be required to be excessively used to cool the retarder brake. However, this is also very disadvantageous in terms of energy consumption.

SUMMARY

The present disclosure has been made to solve the above-mentioned problems occurring in the prior art while advantages achieved by the prior art are maintained intact.

An aspect of the present disclosure provides a cooling system for reducing energy consumption of a cooling fan, as well as efficiently cooling, within a limited installation space, components of a fuel cell electric vehicle that have different cooling requirements and reducing the size of a heat exchanger (a radiator).

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a cooling system for a fuel cell electric vehicle includes a stack cooling line that cools a fuel cell stack of the fuel cell electric vehicle and a first cooling line of a closed loop type that cools at least some of first components that generate a larger amount of heat during braking of the vehicle than during driving of the vehicle, among components of the vehicle.

BRIEF DESCRIPTION OF THE FIGURES

The above and other objects, features and advantages of the present disclosure will be more apparent from the following detailed description taken in conjunction with the accompanying drawings.

DETAILED DESCRIPTION

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

Figure 1:
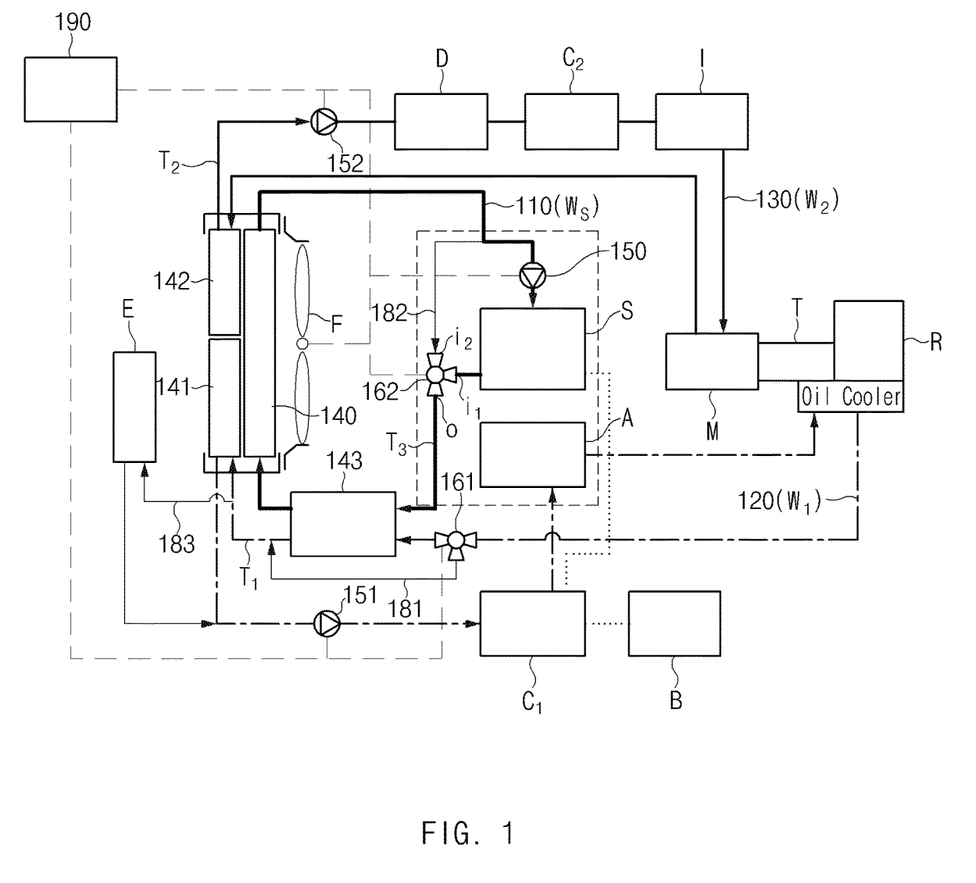
FIG. 1 is a schematic view illustrating a cooling system for a fuel cell electric vehicle according to an embodiment of the present disclosure.

A cooling system for a fuel cell electric vehicle according to an embodiment of the present disclosure will be described in detail with reference to FIG. 1. FIG. 1 is a schematic view illustrating the cooling system for the fuel cell electric vehicle according to the embodiment of the present disclosure. As illustrated in FIG. 1, the cooling system according to this embodiment includes a stack cooling line 110 and a first cooling line 120. The cooling system according to this embodiment may further include a second cooling line 130.

Stack Cooling Line 110

The stack cooling line 110 is a fluid channel for cooling a fuel cell stack S. The fuel cell stack S includes an air electrode (not illustrated), an electrolyte membrane (not illustrated), and a fuel electrode (not illustrated), and because a reaction occurring in the fuel cell stack S is an exothermic reaction, the fuel cell stack S should be appropriately cooled. Due to the general nature of the fuel cell stack S, the cooling line 110 for cooling the fuel cell stack S may be provided independently from the cooling lines 120 and 130 for cooling components other than the fuel cell stack S.

A stack heat exchanger 140 may be provided on the stack cooling line 110. The stack heat exchanger 140 serves to cool a stack coolant $W_s$ flowing along the stack cooling line 110. The stack heat exchanger 140 may be a general radiator. First and second heat exchangers 141 and 142, which will be described below, may also be general radiators. The stack coolant $W_s$ may be water or incompressible fluid. Other coolants, which will be described below, are also the same.

A stack pump 150 for forcibly delivering the stack coolant Ws may be provided on the stack cooling line 110. The stack pump 150 may be an electric water pump for circulating a coolant by driving a motor by electricity. Other pumps 151 and 152, which will be described below, may also be electric water pumps. FIG. 1 illustrates an example in which the stack pump 150 is installed at a point of the stack cooling line 110 between the stack heat exchanger 140 and the fuel cell stack S. However, the installation position of the stack pump 150 is not limited thereto.

A second bypass line 182 may be connected to the stack cooling line 110. A first bypass line 181 connected to the first cooling line 120 will be separately described below. The second bypass line 182 is a fluid channel for selectively diverting at least part of the stack coolant Ws released from the stack heat exchanger 140. For example, the second bypass line 182 may be a fluid channel for the stack coolant $W_s$ that flows into the stack heat exchanger 140 again without being introduced into the fuel cell stack S after released from the stack heat exchanger 140. To this end, the second bypass line 182 is provided to connect the point of the stack cooling line 110 where the stack coolant $W_s$ is introduced into the fuel cell stack S and the point where the stack coolant $W_s$ is released from the fuel cell stack S.

A second valve 162 may be provided at the point where the stack cooling line 110 and the second bypass line 182 are connected. A first valve 161 provided at the point where the first cooling line 120 and the first bypass line 81 are connected will be separately described below. The second valve 162 is a valve for regulating the flow rate of the stack coolant $W_s$ diverted to the second bypass line 182.

For example, when the fuel cell stack S is at high temperature, it may be preferable that a large amount of stack coolant $W_s$ be supplied into the fuel cell stack S. In this case, the flow rate of the stack coolant $W_s$ diverted to the second bypass line 182 may be decreased through control of the second valve 162. Alternatively, when the fuel cell stack S is at low temperature, it may be preferable that a small amount of stack coolant $W_s$ be supplied into the fuel cell stack S. In this case, the flow rate of the stack coolant $W_s$ diverted to the second bypass line 182 may be increased through control of the second valve 162.

The second valve 162 may be a 3-way control valve. The 3-way control valve is a valve having two fluid inlets $i_1$ and $i_2$ and one fluid outlet "o". The 3-way control valve may regulate the flow rates of two fluids introduced through the two fluid inlets $i_1$ and $i_2$, by adjusting the opening between any one fluid inlet and the fluid outlet and the opening between the other fluid inlet and the fluid outlet. More specifically, the second valve 162 may be a thermostat that operates depending on the temperature $T_3$ of the stack coolant $W_s$.

First and Second Cooling Lines 120 and 130

The first cooling line 120 is a fluid channel for cooling at least some of first components of the fuel cell electric vehicle. The second cooling line 130 is a fluid channel for cooling at least some of second components of the fuel cell electric vehicle. The first components refer to components that generate a larger amount of heat during braking than during driving of the vehicle, among components of the fuel cell electric vehicle that are required to be cooled. The second components refer to components other than the first components, among the components of the fuel cell electric vehicle that are required to be cooled. Here, the driving of the vehicle refers to a driving situation other than a braking situation of the vehicle and includes accelerating the vehicle and driving the vehicle at constant speed. Here, the driving of the vehicle may be expressed as a driving situation during non-braking, and the braking may be expressed as a braking situation. The first components may be components that generate a larger amount of heat when the vehicle is made to slow down than when the vehicle is accelerated or driven at constant speed. For example, the first components may be components that generate a larger amount of heat as the vehicle is made to slow down. When the vehicle is driven, the fuel cell stack S may generate power.

The components of the fuel cell electric vehicle may include components that generate a larger amount of heat as the vehicle is driven, components that generate a larger amount of heat as the vehicle is made to slow down, and components that generate heat without a specific tendency depending on any one of the driving and the braking of the vehicle.

The fuel cell stack S is a component that generates a larger amount of heat as the vehicle is driven (e.g., when the fuel cell stack S generates power as the vehicle is accelerated). When a power-generation load increases, the amount of heat generated by the fuel cell stack S also increases. For example, as the vehicle is accelerated, the amount of electricity produced by the fuel cell stack S increases, and as the amount of electricity produced by the fuel cell stack S increases, the amount of heat generated by the fuel cell stack S also increases. Components related to the fuel cell stack S generate heat similarly to the above. The components include a Bi-directional High voltage DC-DC Converter (BHDC) $C_1$ provided between the fuel cell stack S and a high voltage battery B, an air compressor for compressing air and supplying the compressed air to the air electrode of the fuel cell stack S, and an air cooler for cooling the air compressed by the air compressor. The combination of the air compressor and the air cooler are denoted by "A" in FIG. 1. The amount of heat generated by the fuel cell stack S or the components related thereto decreases when the vehicle is made to slow down. For example, during braking of the vehicle the amount of heat generated by the fuel cell stack S also decreases because the amount of electricity produced by the fuel cell stack S decreases.

A retarder brake R is a component that generates a larger amount of heat as the vehicle is made to slow down. When a required brake force increases, the amount of heat generated by the retarder brake R also increases. The retarder brake R is provided in a transmission T connected to a drive motor M for driving the vehicle and is used as an auxiliary brake. For example, the amount of heat generated by the retarder brake R increases as the vehicle is made to slow down by operation of the retarder brake R. This is the same even when a heater resistor is provided as an auxiliary brake. In the case of the auxiliary brake, the amount of heat generated decreases (heat is not generated almost at all) when the vehicle is driven without being made to slow down.

The drive motor M generates heat without a specific tendency both when the vehicle is driven and when the vehicle is made to slow down. The drive motor M generates heat depending on a running load when the vehicle is driven, and generates heat depending on regenerative braking when the vehicle is made to slow down. An inverter I that converts DC voltage supplied from the high voltage battery B to three-phase AC voltage required to drive the drive motor M also similarly generates heat. A Low-Voltage DC-DC Converter (LDC) $C_2$ that converts DC high voltage supplied from the high voltage battery B to DC low voltage, and an accessory D both generate heat regardless of driving and braking. The accessory may be a cooling fan, a power steering oil cooler, or the like.

The cooling system of this embodiment cools the components required to be cooled, with separate cooling lines depending on heat generation characteristics of the components. That is, the cooling system of this embodiment separately includes the cooling line 110 for cooling the fuel cell stack S, which is a component that generates a larger amount of heat as the vehicle is driven, and the cooling line 120 for cooling the first components, which are components that generate a larger amount of heat as the vehicle is made to slow down. Furthermore, the cooling system of this embodiment may separately include the cooling line 130 for cooling the second components, which are components other than the fuel cell stack S and the first components. Accordingly, the cooling system of this embodiment may configure or operate the cooling lines according to the heat generation characteristics of the components, thereby efficiently cooling, within a limited installation space, the components that have different cooling requirements due to the different heat generation characteristics.

In the cooling system illustrated in FIG. 1, the stack cooling line 110 is a line for cooling the fuel cell stack S, the first cooling line 120 is a line for cooling the retarder brake R that is one of the first components, and the second cooling line 130 is a line for cooling the drive motor M that is one of the second components. Oil used to drive the retarder brake R may be cooled in an oil cooler by a first coolant $W_1$ flowing along the first cooling line 120. In the oil cooler, the first coolant $W_1$ may cool oil for the transmission T. That is, heat of the transmission oil may be transferred from the oil cooler to the first coolant $W_1$.

The cooling lines of this embodiment may be provided in a closed loop type. That is, as illustrated in FIG. 1, the cooling lines of this embodiment may be provided such that the coolants circulate through the cooling lines.

Meanwhile, the first and second heat exchangers 141 and 142 may be provided on the first and second cooling lines 120 and 130, respectively. The first heat exchanger 141 serves to cool the first coolant $W_1$ flowing along the first cooling line 120. The second heat exchanger 142 serves to cool a second coolant $W_2$ flowing along the second cooling line 130. As described above, in the case of the cooling system of this embodiment, the separate heat exchangers may be provided on the respective cooling lines. The cooling system of this embodiment may separately design or operate the heat exchangers provided on the cooling lines, in consideration of characteristics required for the cooling lines, thereby improving cooling efficiency. Accordingly, the heat exchangers provided on the respective cooling lines may have different cooling capacities, or may have different sizes.

Meanwhile, the first cooling line 120 may cool the retarder brake R that is one of the first components. The second cooling line 130 may cool the drive motor M that is one of the second components. The temperature required for the first coolant $W_1$ to cool the retarder brake R is higher than the temperature required for the second coolant $W_2$ to cool the drive motor M.

Accordingly, when the first coolant $W_1$ is used to heat a room E, heating performance may be improved, compared with when the second coolant $W_2$ is used. Furthermore, because the first coolant $W_1$ receives heat of the stack coolant $W_s$ through an auxiliary heat exchanger 143 as will be described below when the vehicle is driven, the first coolant $W_s$ is more advantageous for heating the room E.

For indoor heating, the cooling system of this embodiment may further include a heating line 183 connected to the first cooling line 120. The heating line 183 may be provided to connect a point of the first cooling line 120 where the first coolant $W_1$ is introduced into the first heat exchanger 141 and a point where the first coolant $W_1$ is released from the first heat exchanger 141.

Auxiliary Heat Exchanger 143

The cooling system of this embodiment may further include the auxiliary heat exchanger 143 for heat exchange between the stack coolant $W_s$ and the first coolant $W_1$. The auxiliary heat exchanger 143 may be provided to allow for heat exchange between the stack coolant $W_s$ not introduced into the stack heat exchanger 140 and the first coolant $W_1$ not introduced into the first heat exchanger 141. For example, as illustrated in FIG. 1, the auxiliary heat exchanger 143 may be provided to allow for heat exchange between the stack coolant $W_s$ released from the fuel cell stack S toward the stack heat exchanger 140 and the first coolant $W_1$ released from the oil cooler toward the first heat exchanger 141.

Because the cooling system of this embodiment is capable of assigning a cooling capacity required for any one of the stack heat exchanger 140 and the first heat exchanger 141 to the other through the auxiliary heat exchanger 143, the sizes of the stack heat exchanger 140 and the first heat exchanger 141 may be reduced, and energy consumption of a cooling fan F may be decreased. Hereinafter, a specific description thereabout will be given.

When the vehicle is driven, the amount of heat generated by the fuel cell stack S increases depending on a power-generation load, and the amounts of heat generated by the first components such as the retarder brake R decrease. Accordingly, the amount of heat that has to be cooled in the stack heat exchanger 140 increases, and the amount of heat that has to be cooled in the first heat exchanger 141 decreases. Thus, when the vehicle is driven, the first heat exchanger 141 has an extra capacity (a kind of margin) for cooling, compared with when the vehicle is made to slow down.

The cooling system of this embodiment may use the extra cooling capacity of the first heat exchanger 141 through the auxiliary heat exchanger 143 when the vehicle is driven. Because the temperature $T_3$ of the stack coolant $W_s$ is higher than the temperature $T_1$ of the first coolant $W_1$ when the vehicle is driven, heat of the stack coolant $W_s$ may be transferred to the first coolant $W_1$ through the auxiliary heat exchanger 143. The heat transferred to the first coolant $W_1$ may be cooled by the first heat exchanger 141. Accordingly, when the auxiliary heat exchanger 143 is provided, the cooling capacity required for the stack heat exchanger 140 decreases, compared with when the auxiliary heat exchanger 143 is not provided. The size of the stack heat exchanger 140 is also decreased. The cooling fan F is a fan for blowing outside air to the heat exchangers. When cooling of heat generated is assigned to the stack heat exchanger 140 and the first heat exchanger 141, the amount of outside air that the cooling fan F has to blow is also decreased. Accordingly, energy consumption of the cooling fan F is decreased.

When the vehicle is made to slow down, the amount of heat generated by the fuel cell stack S decreases, and the amounts of heat generated by the first components increase. Thus, when the vehicle is made to slow down, the stack heat exchanger 140 has an extra capacity for cooling, compared with when the vehicle is driven. The cooling system of this embodiment may use the extra cooling capacity of the stack heat exchanger 140 through the auxiliary heat exchanger 143 when the vehicle is made to slow down. When the vehicle is made to slow down, heat of the first coolant $W_1$ may be transferred to the stack coolant $W_s$ through the auxiliary heat exchanger 143. The heat transferred to the stack coolant $W_s$ may be cooled by the stack heat exchanger 140.

However, when any coolant is not sufficiently cooled in a heat exchanger due to the heat transferred through the auxiliary heat exchanger 143, a problem may arise in cooling of components. For example, when the first coolant $W_1$ is not sufficiently cooled in the first heat exchanger 141 to a temperature required for cooling the auxiliary brake due to the heat transferred from the stack coolant $W_s$ during driving of the vehicle, the first coolant $W_1$ cannot cool the auxiliary brake to a temperature required by the system. To prevent this, the cooling system of this embodiment may further include the first bypass line 181.

The first bypass line 181 is a fluid channel for selectively diverting at least part of the first coolant $W_1$. As illustrated in FIG. 1, the first bypass line 181 connects the point of the first cooling line 120 where the first coolant $W_1$ is introduced into the auxiliary heat exchanger 143 and the point where the first coolant $W_1$ is released from the auxiliary heat exchanger 143. The first valve 161 may be provided at the point where the first cooling line 120 and the first bypass line 181 are connected. The first valve 161 is a valve for regulating the flow rate of the first coolant $W_1$ diverted to the first bypass line 181. The first valve 161 may be a 3-way control valve.

Meanwhile, the first cooling line 120 may be provided to additionally cool at least one of the BHDC $C_1$ and the air compressor and the air cooler "A", as well as the auxiliary brake that is one of the first components. The BHDC $C_1$, and the air compressor and the air cooler "A" are components that generate a larger amount of heat, as described above, as the vehicle is driven. The BHDC C1, and the air compressor and the air cooler "A" do not correspond to the first components. Because the first cooling line 120 is a fluid channel for cooling the first components that generate heat when the vehicle is made to slow down, the first cooling line 120 takes charge of a very small amount of heat when the vehicle is driven. Accordingly, when the first cooling line 120 cools some of the components that generate a larger amount of heat as the vehicle is driven, the cooling system may be more efficiently designed and operated. The cooling system may be configured such that the first cooling line 120 cools other components that are related to the fuel cell stack S and that generate a larger amount of heat depending on a power-generation load as the vehicle is driven.

The second cooling line 130 may be provided to additionally cool at least one of the accessory D, the LCD $C_2$, and the inverter I, as well as the drive motor M that is one of the second components. The second components are components rather than components that exhibit different heat generation characteristics when the vehicle is driven and when the vehicle is made to slow down. The second components are components that generate heat both when the vehicle is driven and when the vehicle is made to slow down.

Control of Cooling System

The cooling system of this embodiment may further include a processor 190 for control. The processor 190 may perform at least one of controls that will be described below. For reference, the processor 190 may include a microprocessor. Furthermore, the processor 190 may include a memory that stores a plurality of control instructions, on the basis of which commands for controlling the components are generated by the processor.

First, control of the first valve 161 will be described. The processor 190 may be connected to the first valve 161 for control of the first valve 161.

When the temperature $T_1$ of the first coolant $W_1$ introduced into the first heat exchanger 141 is higher than or equal to a first reference temperature during driving of the vehicle, the processor 190 may control the first valve 161 to divert the first coolant $W_1$ to the first bypass line 181.

For example, when the temperature $T_1$ of the first coolant $W_1$ introduced into the first heat exchanger 141 reaches 80° C. as heat of the stack coolant $W_s$ is transferred to the first coolant $W_1$ through the auxiliary heat exchanger 143 during driving of the vehicle, the first coolant $W_1$ released from the first heat exchanger 141 may not be cooled to a required temperature due to the cooling capacity limit of the first heat exchanger 141. In this case, it may be preferable that heat of the stack coolant $W_s$ is not transferred to the first coolant $W_1$. Depending on the temperature $T_1$ of the first coolant $W_1$ introduced into the first heat exchanger 141, the processor 190 may control the first valve 161 such that the flow rate of the first coolant $W_1$ diverted to the first bypass line 181 is varied.

The temperature of 80° C. is an example of the first reference temperature. The allowable temperature of a coolant is generally less than 85° C. in the fuel cell electric vehicle. The temperature of 80° C. is a temperature determined in consideration of this. As described above, the first reference temperature may be determined in consideration of the allowable temperature of the coolant.

When the temperature $T_3$ of the stack coolant $W_s$ introduced into the auxiliary heat exchanger 143 is higher than or equal to a second reference temperature during braking, the processor 190 may control the first valve 161 to divert the first coolant $W_1$ to the first bypass line 181.

Figure 2:
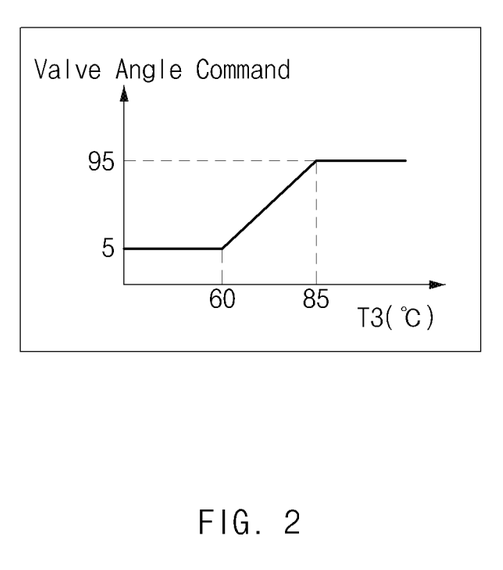
FIG. 2 is a graph illustrating control of a first valve.

For example, when the temperature $T_3$ of the stack coolant $W_s$ introduced into the auxiliary heat exchanger 143 reaches 85° C. during braking, the stack coolant $W_s$ released from the stack heat exchanger 140 may not be cooled to a required temperature. In this case, it may be preferable that heat of the first coolant $W_1$ is not transferred to the stack coolant $W_s$. As illustrated in FIG. 2, depending on the temperature $T_3$ of the stack coolant $W_s$ introduced into the auxiliary heat exchanger 143, the processor 190 may control the first valve 161 such that the flow rate of the first coolant $W_1$ diverted to the first bypass line 181 is varied.

FIG. 2 is a graph illustrating control of the first valve. For reference, with an increase in the valve angle command of FIG. 2, the opening for the first bypass line 181 increases, and the flow rate of the first coolant $W_1$ diverted also increases.

Figure 3:
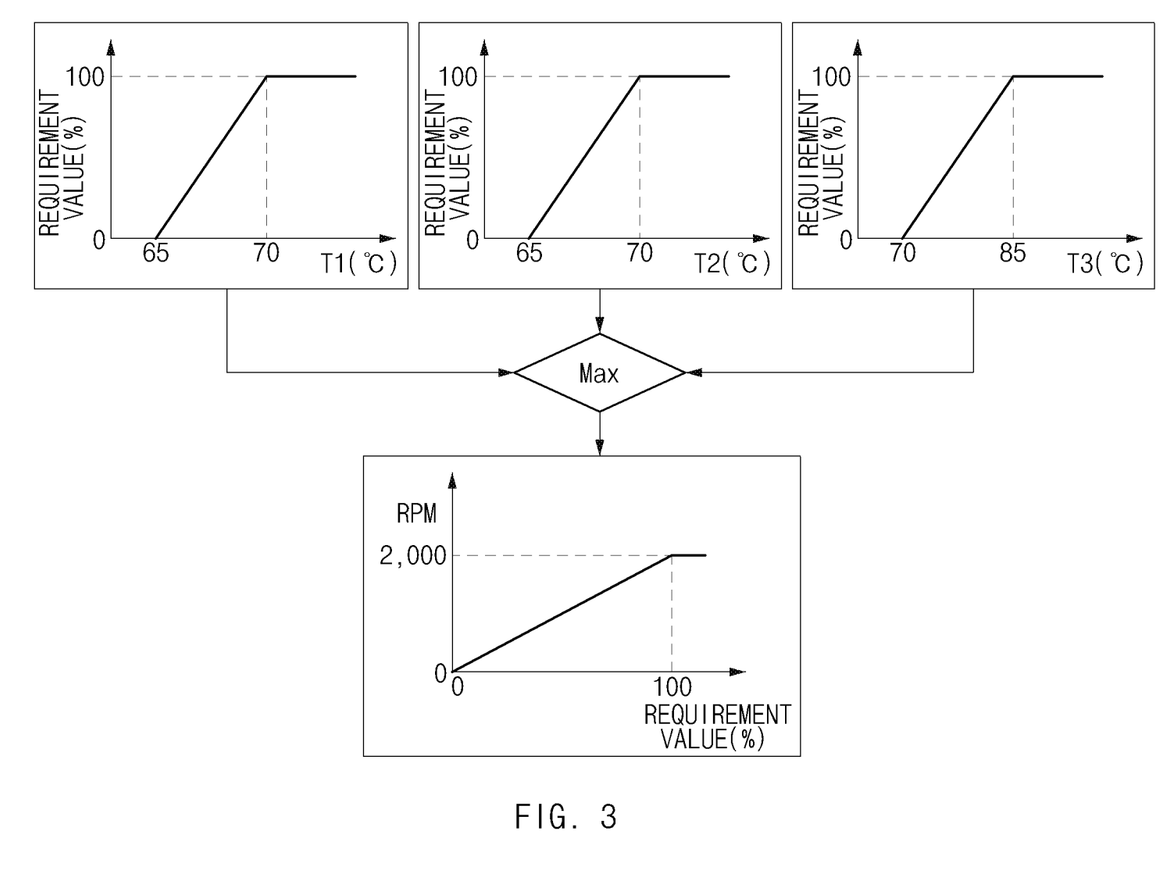
FIG. 3 is a graph illustrating control of a cooling fan.

Second, control of the cooling fan F will be described. The processor 190 may be connected to the cooling fan F for control of the cooling fan F. When the vehicle is driven, the processor 190 may control the cooling fan F, based on at least one of the temperature $T_1$ of the first coolant $W_1$ introduced into the first heat exchanger 141, the temperature $T_2$ of the second coolant $W_2$ released from the second heat exchanger 142, and the temperature $T_3$ of the stack coolant $W_s$ released from the fuel cell stack S. When the temperatures of the coolants rise, the operating RPM of the cooling fan F also has to rise. As illustrated in FIG. 3, as the temperatures of the coolants rise, cooling requirement values increase, and when the cooling requirement values increase, it is preferable to increase the operating RPM of the cooling fan F.

FIG. 3 is a graph illustrating control of the cooling fan. Depending on the temperatures $T_1$, $T_2$, and $T_3$ of the coolants, the cooling fan F may be controlled to operate with an output corresponding to a certain percentage of the maximum output. The cooling requirement values of FIG. 3 represent the percentage. Further, when the temperatures $T_1$, $T_2$, and $T_3$ of the coolants differ from one another, the cooling fan F may be operated according to the maximum requirement value among the requirement values.

Third, control of the pumps will be described. The processor 190 may be connected to the following pumps for control of the pumps. The cooling system of this embodiment may include the stack pump 150 provided on the stack cooling line 110 to forcibly deliver the stack coolant $W_s$, the first pump 151 provided on the first cooling line 120 to forcibly deliver the first coolant $W_1$, and the second pump 152 provided on the second cooling line 130 to forcibly deliver the second coolant $W_2$.

Figure 4:
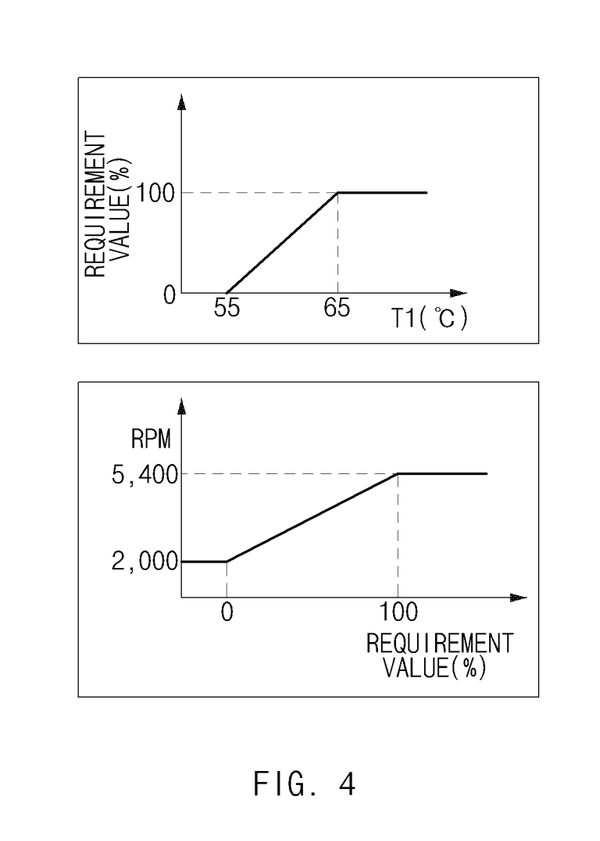
FIGS. 4, 5, and 6 are graphs illustrating control of pumps.
Figure 5:
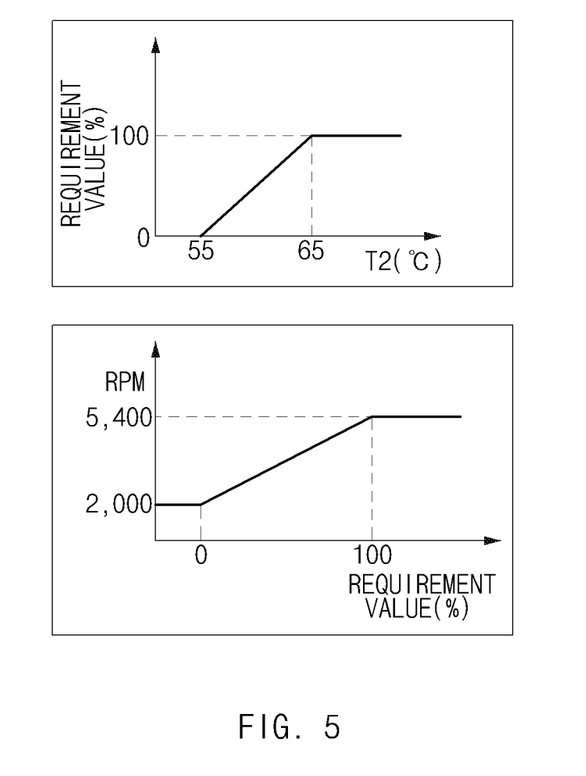
Figure 6:
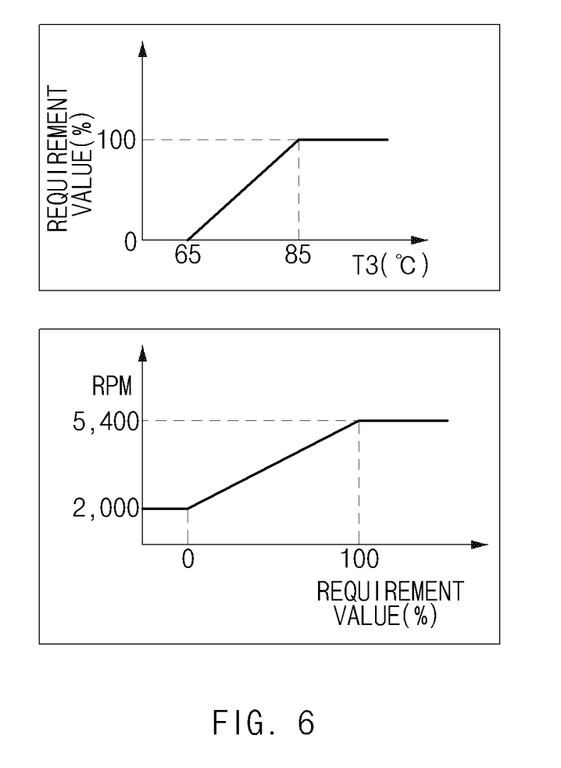

When the vehicle is driven, the processor 190 may control the stack pump 150, based on the temperature $T_3$ of the stack coolant $W_s$ released from the fuel cell stack S. Furthermore, when the vehicle is driven, the processor 190 may control the first pump 151, based on the temperature $T_1$ of the first coolant $W_1$ introduced into the first heat exchanger 141. In addition, when the vehicle is driven, the processor 190 may control the second pump 152, based on the temperature $T_2$ of the second coolant $W_2$ released from the second heat exchanger 142. When the temperatures of the coolants rise, the operating RPMs of the pumps may preferably rise to increase the flow rates of the coolants. As illustrated in FIGS. 4 to 6, as the temperatures of the coolants rise, cooling requirement values increase, and when the cooling requirement values increase, it is preferable to increase the operating RPMs of the pumps. FIGS. 4 to 6 are graphs illustrating control of the pumps.

Fourth, control of the stack pump 150 will be described. The processor 190 may be connected to the stack pump 150 for control of the stack pump 150. When the vehicle is made to slow down, the processor 190 may control the stack pump 150 such that the operating RPM of the stack pump 150 is higher than or equal to a reference RPM. When the vehicle is made to slow down, heat of the first coolant $W_1$ may be transferred to the stack coolant $W_s$ through the auxiliary heat exchanger 143. To transfer more heat, the stack coolant $W_s$ may preferably flow fast. To this end, when the vehicle is made to slow down, the processor 190 may control the stack pump 150 such that the operating RPM of the stack pump 150 is equal to the maximum RPM among the allowable RPMs of the stack pump 150.

Fifth, control of the second valve 162 will be described. The processor 190 may be connected to the second valve 162 for control of the second valve 162. When the vehicle is made to slow down, the processor 190 may control the second valve 162 such that the opening rate for the second bypass line 182 is higher than or equal to a reference opening rate.

The second valve 162 may include the first inlet $i_1$ through which the coolant released from the fuel cell stack S is introduced, the second inlet $i_2$ through which the coolant diverted through the second bypass line 182 is introduced, and the outlet "o" through which the coolants are released. When the opening rate between the second inlet $i_2$ and the outlet "o", that is, the opening rate for the second bypass line 182 increases, the flow rate of the diverted coolant also increases. When the vehicle is made to slow down, a problem due to overheating of the fuel cell stack S is less likely to arise. Accordingly, it may be more preferable to use the stack coolant $W_s$ to cool the auxiliary brake. To this end, when the vehicle is made to slow down, the processor 190 may control the second valve 162 such that the opening rate for the second bypass line 182 is equal to the maximum opening rate among the allowable opening rates.

Figure 7:
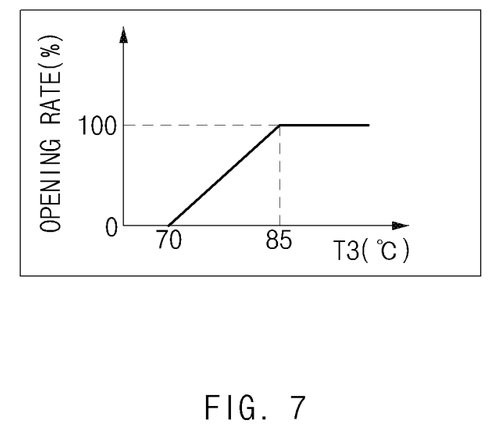
FIG. 7 is a graph illustrating control of a second valve.

For reference, as illustrated in FIG. 7, when the vehicle is driven, it may be preferable to increase the opening rate between the first inlet $i_1$ and the outlet "o", that is, the opening rate for the stack cooling line 110 with a rise in the temperature $T_3$ of the stack coolant Ws. FIG. 7 is a graph illustrating control of the second valve.

According to the present disclosure, the cooling system cools components required to be cooled, with separate cooling lines depending on heat generation characteristics of the components, thereby configuring or operating the cooling lines according to the heat generation characteristics of the components and thus efficiently cooling the components having different cooling requirements within a limited installation space.

In addition, according to the present disclosure, the cooling system assigns a cooling capacity required for one of the stack heat exchanger and the first heat exchanger to the other through the auxiliary heat exchanger, thereby reducing the sizes of the stack heat exchanger and the first heat exchanger and reducing energy consumption of the cooling fan.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims. Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

The invention claimed is:

1. A cooling system for a fuel cell electric vehicle, the cooling system comprising:
    a stack cooling line configured to cool a fuel cell stack of the fuel cell electric vehicle; and
    a first cooling line of a closed loop type configured to cool at least some of first components configured to generate a larger amount of heat during braking of the vehicle than during driving of the vehicle, among components of the vehicle.

2. The cooling system of claim 1, further comprising:
    a stack heat exchanger configured to cool a stack coolant flowing along the stack cooling line; and
    a first heat exchanger configured to cool a first coolant flowing along the first cooling line.

3. The cooling system of claim 2, further comprising:
    an auxiliary heat exchanger configured to allow for heat exchange between the stack coolant prior to flowing into the stack heat exchanger and the first coolant prior to flowing into the first heat exchanger.

4. The cooling system of claim 3, wherein during the driving of the vehicle the auxiliary heat exchanger is configured to transfer heat of the stack coolant to the first coolant so that the stack heat exchanger and the first heat exchanger share a cooling capacity required for cooling of the stack coolant.

5. The cooling system of claim 3, wherein during the braking of the vehicle the auxiliary heat exchanger is configured to transfer heat of the first coolant to the stack coolant so that the stack heat exchanger and the first heat exchanger share a cooling capacity required for cooling of the first coolant.

6. The cooling system of claim 3, further comprising:
    a first bypass line connecting one point of the first cooling line where the first coolant is introduced into the auxiliary heat exchanger and another point of the first cooling line where the first coolant is discharged from the auxiliary heat exchanger to selectively divert at least part of the first coolant flowing along the first cooling line.

7. The cooling system of claim 6, further comprising:
a first valve provided at an intersection between the first cooling line and the first bypass line; and
a processor connected to the first valve;
wherein during the driving of the vehicle the processor controls the first valve to divert the first coolant to the first bypass line when a temperature of the first coolant introduced into the first heat exchanger is higher than or equal to a reference temperature.

8. The cooling system of claim 6, further comprising:
a first valve provided at an intersection between the first cooling line and the first bypass line; and
a processor connected to the first valve;
wherein during the braking of the vehicle the processor controls the first valve to divert the first coolant to the first bypass line when a temperature of the stack coolant introduced into the auxiliary heat exchanger is higher than or equal to a reference temperature.

9. The cooling system of claim 1, further comprising:
a second cooling line of a closed loop type configured to cool at least some of second components other than the first components among the components of the vehicle.

10. The cooling system of claim 2, further comprising:
a second cooling line of a closed loop type configured to cool at least some of second components other than the first components among the components of the vehicle; and
a second heat exchanger configured to cool a second coolant flowing along the second cooling line.

11. The cooling system of claim 10, further comprising:
a cooling fan configured to blow outside air to the stack heat exchanger, the first heat exchanger, and the second heat exchanger; and
a processor connected to the cooling fan;
wherein during the driving of the vehicle the processor controls the cooling fan, based on at least one of a temperature of the stack coolant discharged from the fuel cell stack, a temperature of the first coolant introduced into the first heat exchanger, and a temperature of the second coolant discharged from the second heat exchanger.

12. The cooling system of claim 10, further comprising:
a stack pump provided on the stack cooling line to pump the stack coolant;
a first pump provided on the first cooling line to pump the first coolant;
a second pump provided on the second cooling line to pump the second coolant; and
a processor connected to the stack pump, the first pump, and the second pump;
wherein during the driving of the vehicle the processor:
controls the stack pump, based on a temperature of the stack coolant discharged from the fuel cell stack;
controls the first pump, based on a temperature of the first coolant introduced into the first heat exchanger; and
controls the second pump, based on a temperature of the second coolant discharged from the second heat exchanger.

13. The cooling system of claim 2, further comprising:
a stack pump provided on the stack cooling line to pump the stack coolant discharged from the stack heat exchanger; and
a processor connected to the stack pump;
wherein during the braking of the vehicle the processor controls the stack pump such that an operating RPM of the stack pump is higher than or equal to a reference RPM.

14. The cooling system of claim 2, further comprising:
a second bypass line connecting one point of the stack cooling line where the stack coolant is introduced into the fuel cell stack and another point of the stack cooling line where the stack coolant is discharged from the fuel cell stack to selectively divert at least part of the stack coolant flowing along the stack cooling line;
a second valve provided at an intersection between the stack cooling line and the second bypass line; and
a processor connected to the second valve;
wherein during the braking of the vehicle the processor controls the second valve such that an opening rate for the second bypass line is higher than or equal to a reference opening rate.

15. The cooling system of claim 1, wherein the first cooling line is provided to cool an auxiliary brake that is one of the first components and that is provided in a transmission connected to a drive motor configured to drive the vehicle and assists with a brake force of the vehicle.

16. The cooling system of claim 15, wherein the first cooling line is provided to additionally cool at least one of a Bi-directional High voltage DC-DC Converter (BHDC) provided between the fuel cell stack and a high voltage battery, an air compressor configured to compress air and supply the compressed air to a cathode of the fuel cell stack, and an air cooler configured to cool the compressed air.

17. The cooling system of claim 9, wherein the second cooling line is provided to cool a drive motor configured to drive the vehicle, as one of the second components.

18. The cooling system of claim 17, wherein the second cooling line is provided to additionally cool at least one of a Low-Voltage DC-DC Converter configured to convert DC high voltage supplied from a high voltage battery to DC low voltage and an inverter configured to convert DC voltage supplied from the high voltage battery to three-phase AC voltage required to drive the drive motor.

* * * * *